(12) United States Patent
Bastide et al.

(10) Patent No.: US 10,826,865 B2
(45) Date of Patent: **\*Nov. 3, 2020**

(54) VISIBILITY MANAGEMENT ENHANCEMENT FOR MESSAGING SYSTEMS AND ONLINE SOCIAL NETWORKS

(71) Applicant: International Business Machines Corporation, Armonk, NY (US)

(72) Inventors: Paul R. Bastide, Ashland, MA (US); Lisa M. W. Bradley, Cary, NC (US); Jonathan Dunne, Dungarvan (IE); Liam Harpur, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,553

(22) Filed: Apr. 17, 2019

(65) Prior Publication Data

US 2019/0245826 A1  Aug. 8, 2019

Related U.S. Application Data

(63) Continuation of application No. 15/286,915, filed on Oct. 6, 2016, now Pat. No. 10,361,989.

(51) Int. Cl.
*H04L 12/58* (2006.01)
*H04L 29/08* (2006.01)

(52) U.S. Cl.
CPC .............. *H04L 51/32* (2013.01); *H04L 67/26* (2013.01)

(58) Field of Classification Search
CPC ................................ H04L 51/32; H04L 67/26
See application file for complete search history.

(56) References Cited

U.S. PATENT DOCUMENTS

| | | | |
|---|---|---|---|
| 6,253,234 | B1 | 6/2001 | Hunt et al. |
| 7,418,661 | B2 | 8/2008 | Brandenberger |
| 7,505,919 | B2 | 3/2009 | Richardson |
| 9,298,839 | B2 | 3/2016 | Carter et al. |
| 9,614,804 | B2 | 4/2017 | Myles |
| 2006/0064467 | A1 | 3/2006 | Libby |
| 2008/0189163 | A1 | 8/2008 | Rosenberg et al. |
| 2009/0113003 | A1 | 4/2009 | Lu et al. |
| 2009/0132662 | A1 | 5/2009 | Sheridan et al. |

(Continued)

FOREIGN PATENT DOCUMENTS

WO      2015161901 A1    10/2015

OTHER PUBLICATIONS

List of IBM Patents or Patent Applications Treated as Related, filed Apr. 17, 2019.

(Continued)

*Primary Examiner* — John M Macilwinen
(74) *Attorney, Agent, or Firm* — L. Jeffrey Kelly; Edell, Shapiro & Finnan, LLC

(57) ABSTRACT

A method, a processing device, and a computer program product are provided. An initial state of a message is captured by at least one processing device. At least one external reference from the message is extracted by the least one processing device. The at least one external reference is analyzed to establish a baseline state of the message. A state of the message is monitored with respect to the baseline state of the message. A visibility of the message is changed based on detecting changes in relation to the baseline state of the message.

16 Claims, 9 Drawing Sheets

(56) References Cited

U.S. PATENT DOCUMENTS

| | | |
|---|---|---|
| 2011/0060727 A1 | 3/2011 | Koul et al. |
| 2012/0089681 A1 | 4/2012 | Chowdhury et al. |
| 2013/0055128 A1 | 2/2013 | Muti et al. |
| 2013/0230248 A1 | 9/2013 | Alexander et al. |
| 2015/0331947 A1 | 11/2015 | Elgebeely et al. |
| 2016/0134582 A1 | 5/2016 | Rubinstein et al. |
| 2018/0103003 A1 | 4/2018 | Bastide et al. |

OTHER PUBLICATIONS

Craigslist.org Help FAQ. Capture date: Mar. 9, 2015. pp. 1-9. (Year: 2015).

VISIBILITY MANAGEMENT ENHANCEMENT FOR MESSAGING SYSTEMS AND ONLINE SOCIAL NETWORKS

BACKGROUND

Present invention embodiments are related to systems, methods and computer program products for managing presentation and availability of messages of a communication system (e.g., online social network messages, messaging system messages, etc.).

Messaging systems and online social networks are universal mechanisms for connecting people and information in logical and organized ways, which enable sharing and processing of information between users. Common mechanisms for sharing and processing information include messaging systems, online bulletin boards and online social networks. Through these common mechanisms, one may rapidly share information with others as well as gather information from others. Each user may create, read and respond to numerous messages each day without regard to continued validity of content in the messages.

SUMMARY

In a first aspect of the invention, a computer-implemented method is provided for content visibility management in a messaging system or an online social network. An initial state of the message is captured by at least one processing device. The at least one processing device extracts at least one external reference from the message and analyzes the at least one external reference to establish a baseline state of the message. The at least one processing device monitors a state of the message with respect to the baseline state of the message. A visibility of the message is changed, by the at least one processing device, based on detecting changes in relation to the baseline state of the message.

In a second aspect of the invention, a system is provided for content visibility management in a messaging system or an online social network. The system includes at least one processor and at least one memory connected to the at least one processor. The at least one memory includes instructions to configure the at least one processor to: capture an initial state of a message; extract at least one external reference from the message; analyze the at least one external reference to establish a baseline state of the message; monitor a state of the message with respect to the baseline state of the message; and change a visibility of the message based on detecting changes in relation to the baseline state of the message.

In a third aspect of the invention, a computer program product is provided. The computer program product includes at least one computer readable medium that has computer readable program code embodied therewith for execution on a processing system. The computer readable program code is configured to be executed by the processing system to: capture an initial state of the message; extract at least one external reference from the message; analyze the at least one external reference to establish a baseline state of the message; monitor a state of the message with respect to the baseline state of the message; and change a visibility of the message based on detecting changes in relation to the baseline state of the message.

BRIEF DESCRIPTION OF THE DRAWINGS

Generally, like reference numerals in the various figures are utilized to designate like components.

DETAILED DESCRIPTION

A user may post a message with one or more external references via a mail client or an online social network (OSN). After a short period of time, the message may no longer be valid. For example, a user may post a message with one or more external references. The message may say, "What about the game last night?". In twenty-four hours or less, the message becomes invalid. In various embodiments a message may be determined to be invalid based on determining an amount of change to the message and the one or more external references with respect to an established baseline. When the amount of change is determined to be greater than a predetermined threshold, the message may be considered invalid and visibility of the message may be changed for some or all users. In some embodiments, the message may be considered invalid after a particular amount of time has elapsed since the message was posted, as determined by a predictive model.

In various embodiments, a number of user categories may be defined, each of which may have a respective predefined threshold of change. When the posted message and the one or more external references are determined to have changed by more than the respective threshold of change for any of the user categories, the posted message is considered to be invalid and visibility of the message may be changed for users included in those user categories with predefined thresholds of change that have been exceeded. That is, the posted message may no longer be visible to only the users in those categories. In an alternate embodiment, instead of the message not being visible to only the users in those categories, the message may be decorated with an indicator that indicates that the message is out-of-date or no longer valid.

Figure 1:
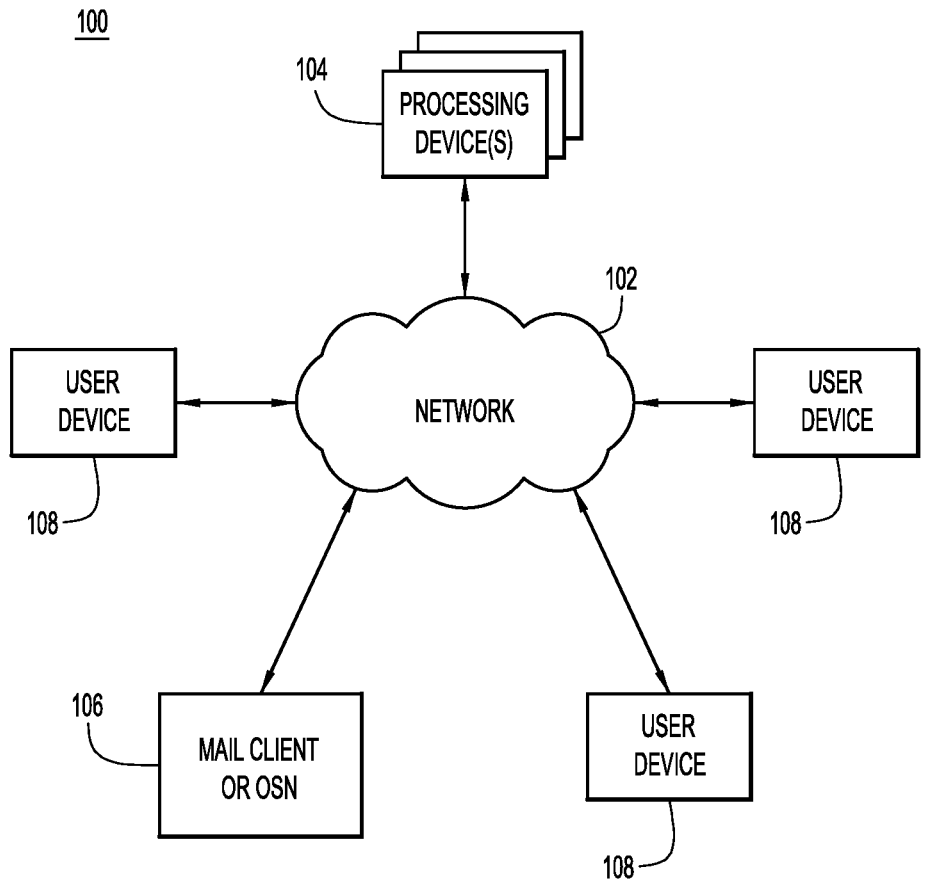
FIG. 1 illustrates an example environment in which embodiments of the invention may operate.

With reference now to FIG. 1, an example environment 100 for implementation of embodiments is shown. Environment 100 may include a network 102, a mail client or one or more servers for an online social network (OSN) 106, one or more processing devices 104 and one or more user devices 108. Each of mail client or one or more servers for an OSN 106, one or more processing devices 104 and one or more user devices 108 may be connected to network 102. Network 102 may include wireless and/or wired networks and may further include a general wide area network (WAN), a local area network (LAN) and/or a public network (e.g. the Internet).

One or more processing devices 104 may execute an application for monitoring messages associated with mail client 106 or postings of an OSN 106. User devices 108 may send and receive messages via mail client 106 or may receive and send postings via OSN 106.

Figure 2:
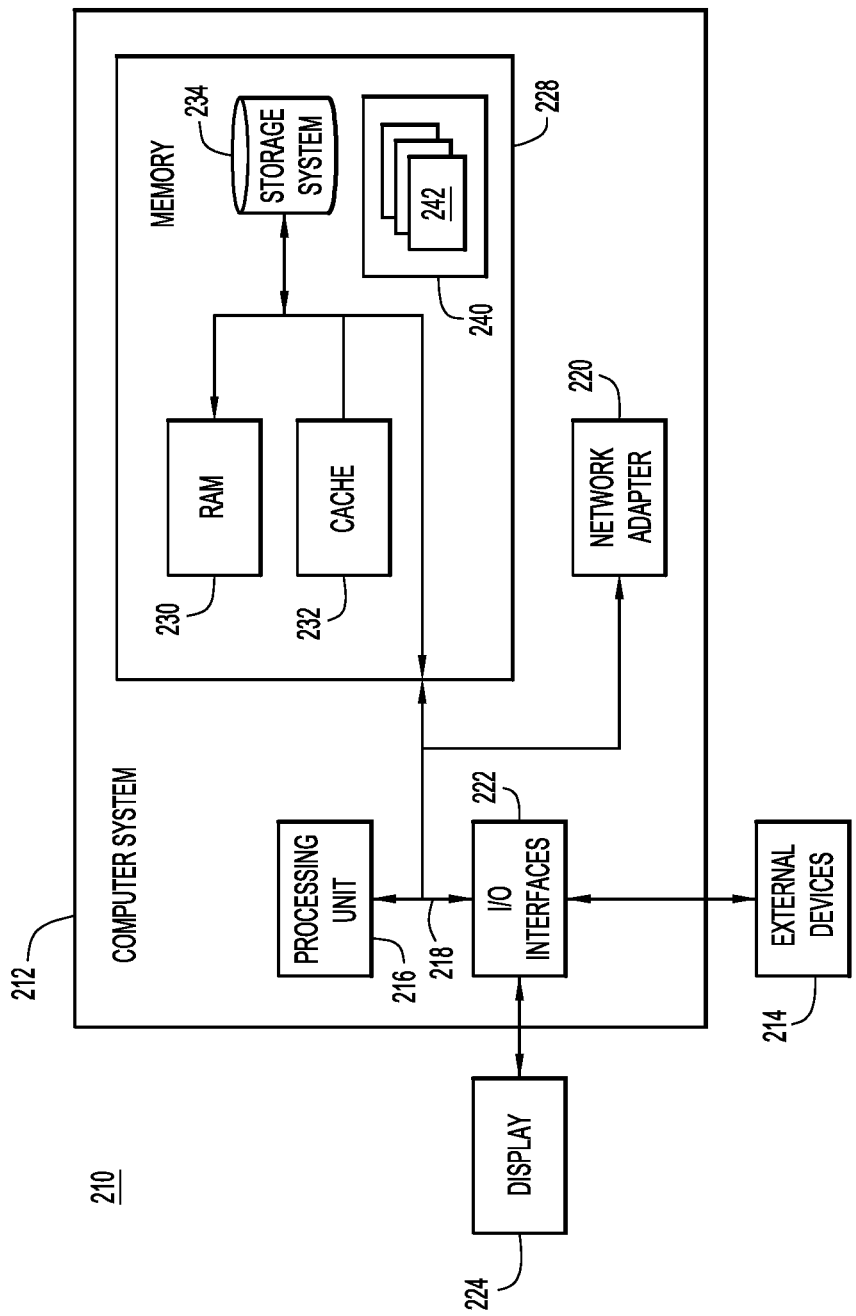
FIG. 2 is a functional block diagram of an example processing device which may be employed to implement various embodiments of the invention.

Referring now to FIG. 2, a schematic of an example processing device 210, which may implement processing device 104 or user device 108 is shown. Processing device 210 is only one example of a suitable processing device for the environment of FIG. 1 and is not intended to suggest any limitation as to the scope of use or functionality of embodiments of the invention described herein. Regardless, processing device 210 is capable of being implemented and/or performing any of the functionality set forth herein.

In processing device 210, there is a computer system 212 which is operational with numerous other general purpose or special purpose computing system environments or configurations. Examples of well-known computing systems, environments, and/or configurations that may be suitable for use with computer system 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules, being executed by a computer system. Generally, program modules may include routines, programs, objects, components, logic, data structures, and so on that perform particular tasks or implement particular abstract data types. Computer system 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system 212 is shown in the form of a general-purpose computing device. Components of computer system 212 may include, but are not limited to, one or more processors or processing units 216, a system memory 228, and a bus 218 that couples various system components including system memory 228 to one or more processors 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and includes both volatile and non-volatile media, removable and non-removable media.

System memory 228 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 220. As depicted, network adapter 220 communicates with the other components of computer system 212 via bus 218. It should be understood that, although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Figure 3:
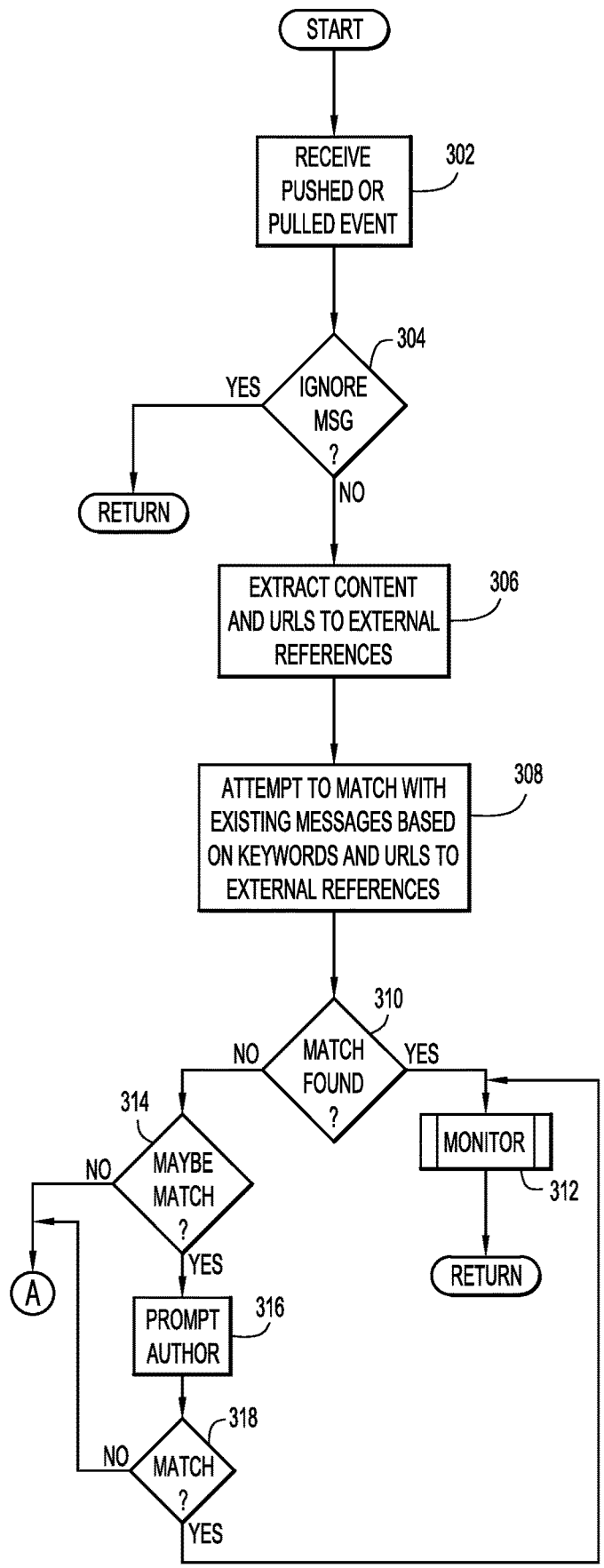
FIGS. 3 and 4 are flowcharts that illustrate an example process for receiving and processing messages in various embodiments.
Figure 4:
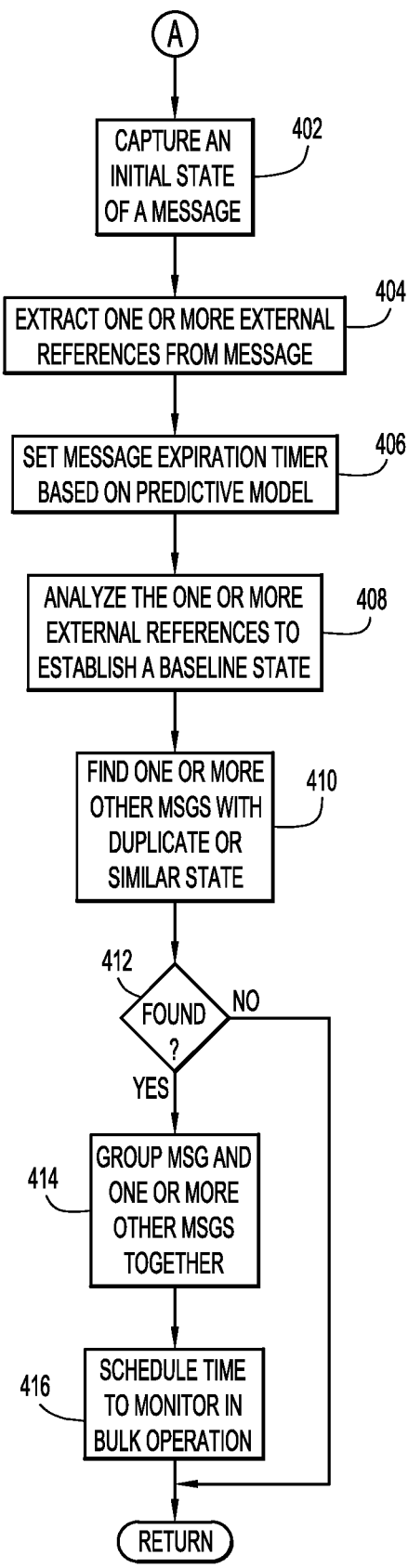

FIGS. 3 and 4 are flowcharts of an example process that may be performed in various embodiments. The process may begin by receiving a pushed event or a pulled event from OSN 106 or mail client 106 (act 302). Next, the process may determine whether a message associated with the event is to be ignored (act 304). For example, embodiments may be configured to ignore specifically flagged messages or messages from specific management chains. If the message is to be ignored, then the process is completed. Otherwise, message contents may be extracted as well as uniform resource locators (URLs) to external references (act 306). The process may then attempt to match the message with known existing messages based on keywords and URLs to external references (act 308).

In some embodiments, one or more keywords may be automatically derived. For example, words in a message may be examined to determine a subject of the message. A phrase from the message may be determined as a keyword based on uniqueness of the phrase among the known existing messages.

The process may then determine whether the message matches a received known message (act 310). If the message matches a received known message, then a monitor process may be called to determine changes to the message (act 312).

If, during act 310, the process determines that the message does not match a received known message, then the process may determine whether the message matches a received known message within a predetermined percentage (act 314). The predetermined percentage may be 95%, 90% or some other value. If the message matches a received known message within the predetermined percentage, then an author of the message may be prompted regarding whether the message and the received known message are a match (act 316). If the author indicates that the message and the received known message match, then a monitor process may be called to determine any changes to the message since the message was last processed (act 312).

In an alternative embodiment, if during act 314, the message matches the received known message, within a second predetermined percentage which is less than the predetermined percentage, then the message may be considered ambiguous and the process may highlight the message and may remove the ambiguous message from further consideration.

If, during act 314, the message is determined to be unmatched, then the message may be considered a new message an initial state of the message may be captured to establish a baseline (act 402; FIG. 4).

In OSN 106, the initial state of the message may be captured using an application program interface (API) to OSN 106. For example, via the API, embodiments may capture items of data within field level data, content data, referential data and generation data. Field level data may include, but not be limited to, an indication of to whom the message is sent, a title of the message, content of the message, a time and a date when the message was sent, and an identifier regarding an author of the message. Content data may include, but not be limited to, a subject, a sentiment, a callout to a particular person (@Mention), hashtags, and a URL. Referential data may include, but not limited to, callouts to a particular person (@Mention), hashtags, URLs (for retrieving binary data and hypertext markup language (HTML) data), video references, image references, number of shares or re-shares, and number of recommendations. Generation data may include, but not be limited to, existing cookies, URL parameters, and state maintaining information which may include an amount of data storage, a language, and a referrer, which may be a web address.

The process may then extract and persist one or more external references from the message (act 404). The external references may include, but not be limited to, text, subjects, times, dates, links and videos).

A message expiration timer may be set based on a predictive model (act 406). The predictive model may determine the message expiration time based on observations regarding similar types of messages. Before enough information is collected to create the predictive model, a starter model may be used as the predictive model.

One or more of the external references may then be analyzed to establish a baseline state, which may be stored as a function of data elements and as a representation of the at least one external reference (act 408). Various embodiments may extract content from the one or more references and may break the reference down to natural language elements including, but not limited to, words, phrases, HTML entities, videos, images, and entities such as, for example, a phone number, a Person name, a date, etc.

Embodiments may store a base calculated baseline state with minimum descriptive information (e.g., a banner advertisement may not be stored).

The established baseline state may then be used to find one or more other messages with a duplicate or a similar baseline state (act 410). The similar baseline state of the one or more other messages may be within a predetermined threshold (e.g., 1% or another value) of the established baseline state. The process may then determine whether the one or more other messages are found (act 412). If the one or more other messages are found, then the message and the one or more other messages may be grouped together (act 414) and a time may be scheduled to monitor the group in a bulk operation (act 416).

If, during 412, one or more other messages with duplicate or similar states are not found, then the process may be completed.

Figure 5:
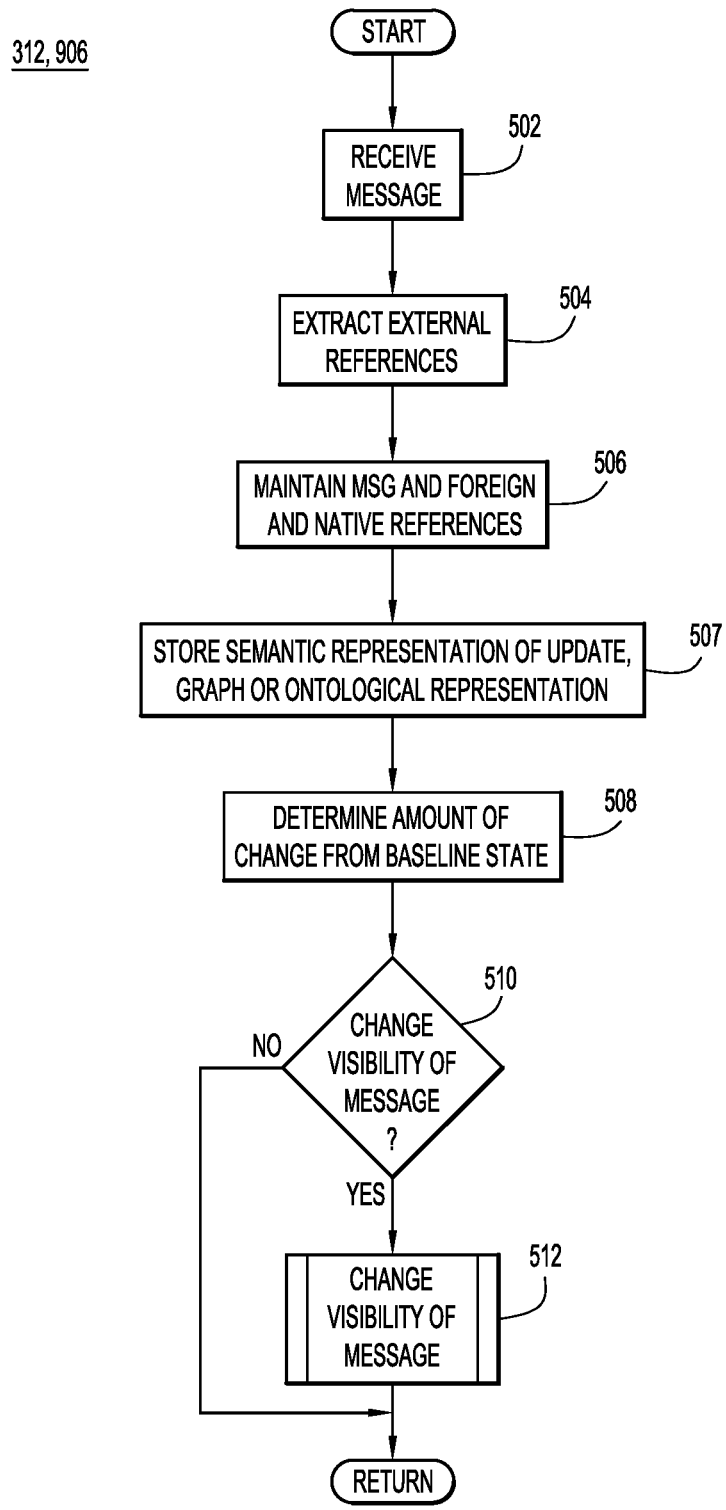
FIG. 5 is a flowchart that illustrates an example process for monitoring a message and one or more external references for changes.

FIG. 5 is a flowchart that illustrates an example process 312, 906 for monitoring received messages. The process may begin by receiving a message (act 502) and extracting one or more external references from the message and further may extract exact Hyper-Text Markup Language (HTML) of the message and/or a snapshot or image of the message (act 504). The message, along with foreign and native external references, may be maintained or persisted (act 506).

A semantic representation of an update, graph or ontological representation may be stored (act 507). In some embodiments, the semantic representation may be stored inline with the message. As an example, if a user posts an update of "Going to Dave and Buster's tonight", supporting data, or data used to evaluate the post, may be stored. Analysis of the post at a time of creation may determine that the post is positive and may store a sentiment with the post (hidden, but associated in a database). Analysis may determine that Dave and Buster are people and semantic labels indicating this may be stored with the post. At a later point in time, analysis may determine that Dave and Buster's is a restaurant. The semantic labels associated with Dave and Buster may be deleted and new semantic labels may be stored with the post indicating that Dave and Buster's is a restaurant. Further, a graph representation may indicate links between the post, or message, and a reference. For example, message1 may be linked to reference1 by a concept such as food. The linkage may be stored with the original post, or message.

An amount of change with respect to the baseline state may then be determined (act 508). In some embodiments, each item of data may have a custom level of change assigned thereto. The custom level of change may be 1%, 10%, or another percentage value.

The process may determine whether the amount of change, with respect to the baseline state, is greater than a predetermined percentage value, indicating a change in visibility of the message (act 510). If the amount of change is determined to be greater than the predetermined percentage value, then a process may be called to perform any processing related to a change in the visibility of the message (act 512).

Figure 6:
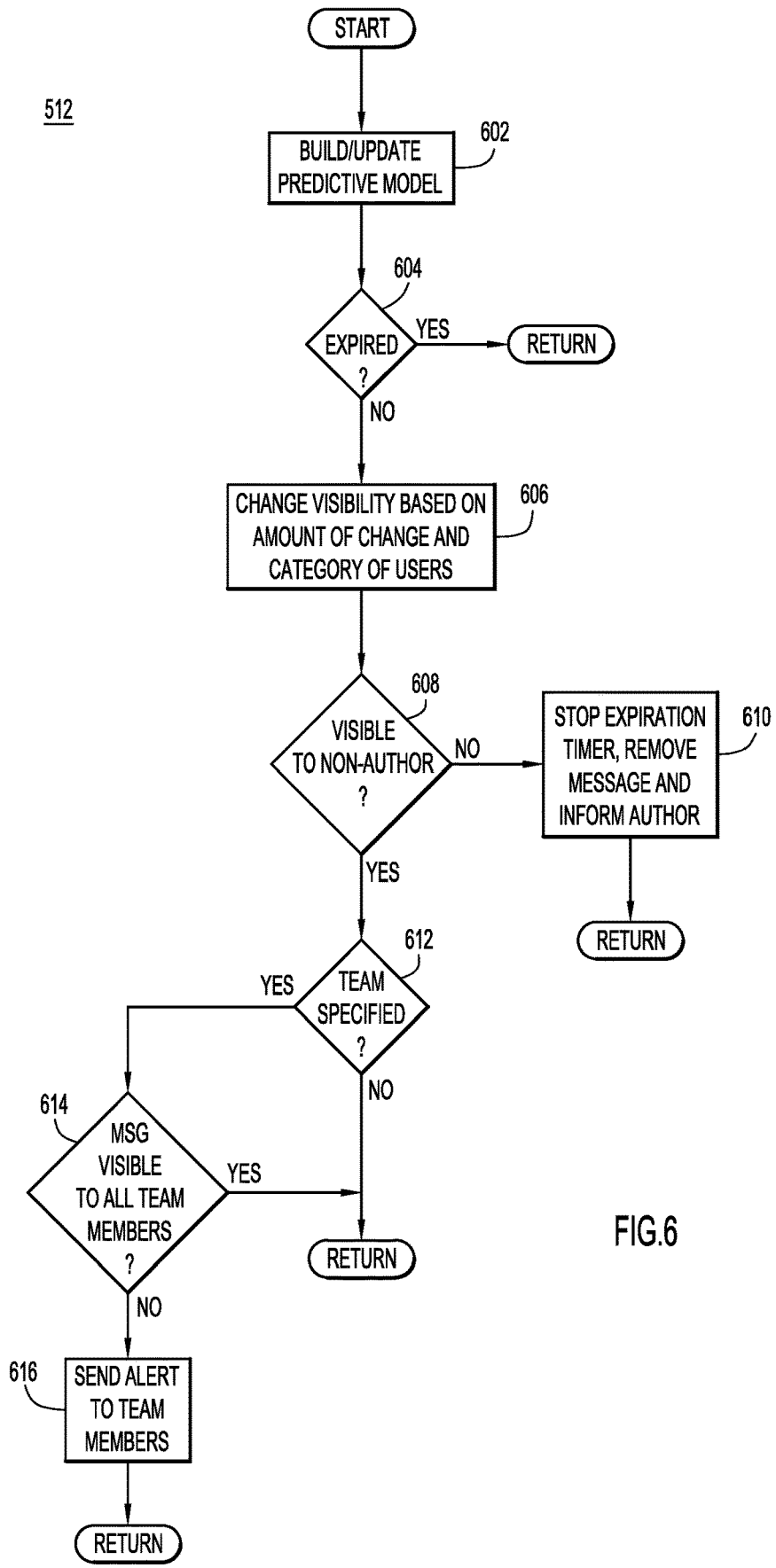
FIG. 6 is a flowchart of an example process for changing a visibility of a message.

FIG. 6 is a flowchart illustrating an example process 512 for processing a change in visibility of a message. The process may begin by building or updating a predictive model based on historic analysis (act 602). The predictive model may be used to predict when particular types of messages are likely to become invalid or out of date based on observations. As an example, suppose a minor change (+0.5% of content) with respect to the baseline state or a reference is detected. At a later point in time, a 10% change may be detected. Based on the predictive model, a next change may be predicted to exceed a threshold such as 15% or another threshold value. In some embodiments, visibility of the content may be controlled based on a prediction that the content will soon become less visible.

Next, a determination may be made regarding whether the expiration timer for the message has already expired. If so, the process may be completed. Otherwise, a change in visibility may be processed based on an amount of change and a respective category of users (act 606).

An administrator or each author user may configure a percentage of change for each category of user. When the amount of change is more than the configured percentage of change for a particular category of user, then the visibility of the message may be changed with respect to that particular category of user. The categories may include, but not be limited to: everyone; users who commented on the message; close friends of the author user; and the author or posting user. As an example, the configured percentage of change may be 85% for everyone, 75% for those who commented on the message, 90% for close friends, and 90% for the author or posting user.

Figure 7:
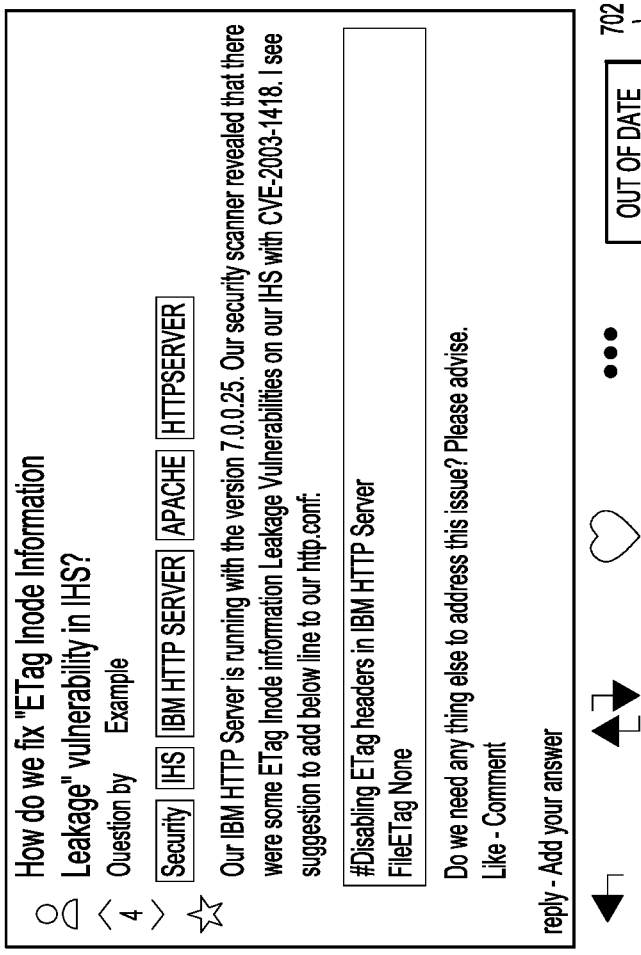
FIG. 7 illustrates a message with an out-of-date marking.

When the visibility is changed for a particular category of user, either the posted message is no longer visible to users of the particular category, or the message may be marked to indicate that the message is out of date. Therefore, in this application, the term, visibility, refers to availability of a message for viewing or whether a message is displayed with or without an out-of-message marking. FIG. 7 shows an example of a message that is marked out of date. In FIG. 7, out-of-date marking 702 appears in a lower right-hand portion of the displayed message. In other embodiments, out-of-date marking 702 may appear anywhere in the displayed message.

Returning to FIG. 6, a determination may be made regarding whether the message is visible, or not marked as out-of-date, with respect to any user other than the author or posting user (act 608). If the message is not visible, or is marked as out-of-date, with respect to all users other than the author or posting user, then the message expiration timer may be stopped, the message may be removed, and the author or posting user may be informed that the message expired and was removed (act 610). In an alternate embodiment, during act 610, the message expiration timer may be stopped, and the author or posting user may be informed to remove the message.

If, during act 608, the message is determined to be visible, or not marked as out-of-date, then a determination may be made whether the message is associated with a team of users, which may be configured by the author or posting user (act 612). If the message is determined to not be associated with a team of users, the process may be completed. Otherwise, a determination may be made regarding whether the message is visible, or not out-of-date, with respect to all users who are members of the team (act 614). If the message is determined to be visible, or not out-of-date, with respect to all users who are team members, then the process may be completed. Otherwise, an alert may be sent to inform the users who are team members that some team members may not be able to access the message or the message may be marked as out-of-date with respect to some of the team members (act 616). The process may then be completed.

Figure 8:
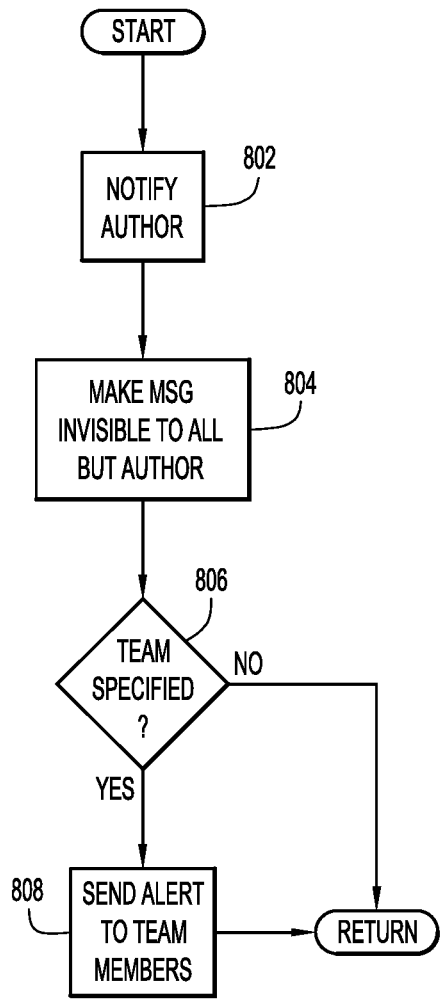
FIG. 8 is a flowchart of an example process that may be performed when a message expiration timer expires.

FIG. 8 is a flowchart of an example process that is performed when a message expiration timer expires. The process may begin by notifying the author or posting user that the message expiration timer expired (act 802). The message may then be made invisible, or marked as out-of-date, to all categories of users except the author or posting user (act 804). A determination may be made regarding whether a team of users is specified for the message (act 806). If the team of users is specified, then an alert regarding the message may be sent to team members (act 808) and the process may be completed. If, during act 806, the team of users is determined to not be specified, the process may be completed.

Figure 9:
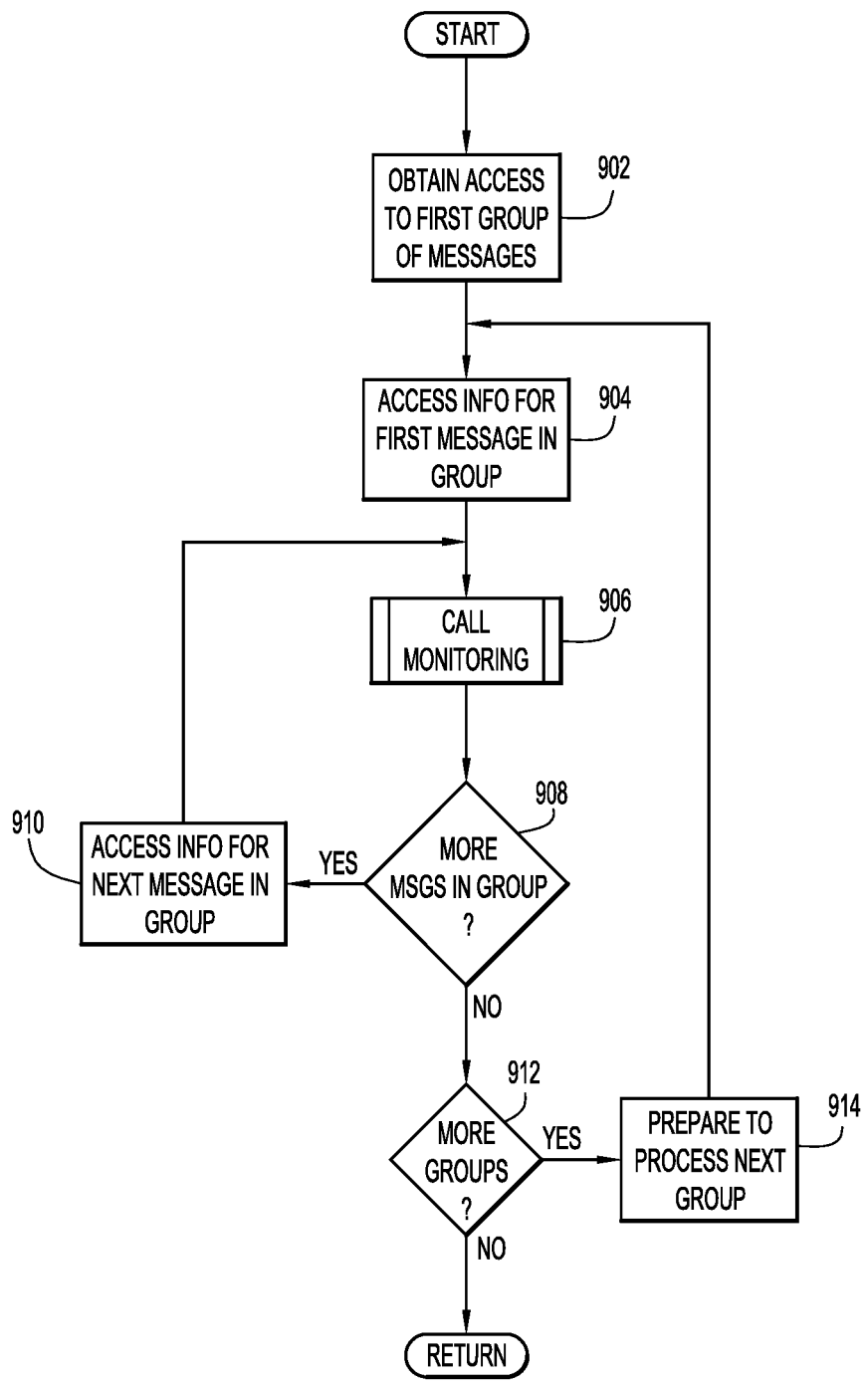
FIG. 9 is a flowchart of an example process for processing groups of duplicate or similar messages.

FIG. 9 is a flowchart of an example process that is performed at a scheduled time to process groups of similar or duplicate messages. The process may begin by obtaining access to a first group of messages (act 902). Information may then be accessed for a first message in the group (act 904). The monitoring process may then be called to monitor the message and at least one external reference for changes (act 906).

A determination may be made regarding whether there are any additional messages in the group (act 908). If there are additional messages in the group, then information is accessed for a next message in the group (act 910) and acts 906-908 may be repeated. Otherwise, a determination may be made regarding whether there are additional groups of similar or duplicate messages to process (act 912). If so, then the process prepares to access the next group (act 914) and acts 904-912 may be repeated.

If, during act 912, it is determined that no additional groups remain to be processed, then the process may be completed.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and may communicate via any suitable communications medium (e.g., LAN, WAN, Intranet, Internet, hardwired, modem connection, wireless, etc.). For example, the functions of the present invention embodiments may be distributed in any manner among the various systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to a server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim as our invention:

1. A computer-implemented method for content visibility management in a communication system, the computer-implemented method comprising:
 capturing, by at least one processing device, an initial state of a message;
 extracting, by the at least one processing device, at least one external reference from the message;
 analyzing, by the at least one processing device, the at least one external reference to establish a baseline state of the message;
 monitoring, by the at least one processing device, a level of change of the message with respect to the baseline state of the message;
 changing, by the at least one processing device, a visibility of the message with respect to at least one category of users of a plurality of categories of users based on detecting the level of change in relation to the baseline state of the message exceeding a respective threshold level of change of each of the at least one category of users; and
 performing, by the at least one processing device, in response to determining that the message is visible to at least some users other than an author of the message, determining that the message is associated with a team of users, and determining that the message is not visible to all users of the team of users:
  informing users of the team of users that some users of the team of users may not be able to access the message.

2. The computer-implemented method of claim 1, wherein the capturing the initial state of the message further comprises:
 detecting the message when a push event occurs as a result of the message being published to a subscriber and the subscriber acting on the message; and
 detecting an updated entry when a pull event occurs and the updated entry is added to a message list.

3. The computer-implemented method of claim 2, wherein each push event and each pull event comprises at least one item of information from a group consisting of field level data, content data, sentiment information, grammar information, a video reference, an image reference, generation data, location history, and language information.

4. The computer-implemented method of claim 1, wherein the analyzing the at least one external reference to establish the baseline state of the message further comprises:
 retrieving each of the at least one reference at a time of creation or first analysis;
 storing a baseline as a function of data elements and as a representation of the at least one external reference; and
 storing one of a URL and an image.

5. The computer-implemented method of claim 1, wherein the monitoring the baseline state of the message further comprises:
 continually retrieving data related to the at least one external message;

building a model which predicts the level of change between the baseline state and a new state of the message; and predicting when the level of change will exceed a threshold based on the predictive model.

6. The computer-implemented method of claim 1, further comprising:

determining one or more other messages within a predefined threshold of change with respect to the established baseline state;

monitoring, in a bulk operation, the one or more other messages; and updating a state of the message and a respective state of the one or more other messages based on the monitoring in the bulk operation.

7. A system for content visibility management in a communication system, the system comprising:

at least one processor; and at least one memory connected to the at least one processor, the at least one memory including instructions to configure the at least one processor to:

capture an initial state of a message;

extract at least one external reference from the message;

analyze the at least one external reference to establish a baseline state of the message;

monitor a level of change of the message with respect to the baseline state of the message;

change a visibility of the message with respect to at least one category of users of a plurality of categories of users based on detecting the level of change in relation to the baseline state of the message exceeding a respective threshold level of change of each of the at least one category of users; and perform, in response to determining that the message is visible to at least some users other than an author of the message, determining that the message is associated with a team of users, and determining that the message is not visible to all users of the team of users:

informing users of the team of users that some users of the team of users may not be able to access the message.

8. The system of claim 7, wherein the capturing the initial state of the message further comprises:

detecting the message when a push event occurs as a result of the message being published to a subscriber and the subscriber acting on the message; and detecting an updated entry when a pull event occurs and the updated entry is added to a message list.

9. The system of claim 8, wherein each push event and each pull event comprises at least one item of information from a group consisting of field level data, content data, sentiment information, grammar information, a video reference, an image reference, generation data, location history, and language information.

10. The system of claim 7, wherein analyzing the at least one external reference to establish a baseline state of the message further comprises:

retrieving each of the at least one reference at a time of creation or first analysis;

storing a baseline as a function of data elements and as a representation of the at least one external reference; and storing one of a URL and an image.

11. The system of claim 7, wherein the monitoring of the baseline state of the message further comprises:

continually retrieving data related to the at least one external message;

building a predictive model which predicts the level of change between the baseline state and a new state of the message; and predicting when the level of change will exceed a threshold based on the predictive model.

12. The system of claim 7, wherein the at least one processor is further configured to:

determine one or more other messages within a predefined threshold of change with respect to the established baseline state;

monitor, in a bulk operation, the one or more other messages; and update a state of the message and a respective state of the one or more other messages based on the monitoring in the bulk operation.

13. A computer program product comprising:

at least one computer readable storage medium having computer readable program code embodied therewith for execution on a processing device, the computer readable program code being configured to be executed by the processing device to:

capture an initial state of a message;

extract at least one external reference from the message;

analyze the at least one external reference to establish a baseline state of the message;

monitor a level of change of the message with respect to the baseline state of the message;

change a visibility of the message with respect to at least one category of users of a plurality of categories of users based on detecting the level of change in relation to the baseline state of the message exceeding a respective threshold level of change of each of the at least one category of users; and perform, in response to determining that the message is visible to at least some users other than an author of the message, determining that the message is associated with a team of users, and determining that the message is not visible to all users of the team of users:

informing users of the team of users that some users of the team of users may not be able to access the message.

14. The computer program product of claim 13, wherein the computer readable program code being configured to be executed by the processing device to capture an initial state of a message is further configured to be executed by the processing device to:

detect the message when a push event occurs as a result of the message being published to a subscriber and the subscriber acting on the message; and detect an updated entry when a pull event occurs and the updated entry is added to a message list, wherein each push event and each pull event comprises at least one item of information from a group consisting of field level data, content data, sentiment information, grammar information, a video reference, an image reference, generation data, location history, and language information.

15. The computer program product of claim 13, wherein the computer readable program code is further configured to be executed by the processing device to:

determine one or more other messages within a predefined threshold of change with respect to the established baseline state;

monitor, in a bulk operation, the one or more other messages; and update a state of the message and a respective state of the one or more other messages based on the monitoring in the bulk operation.

16. The computer program product of claim 13, wherein the computer readable program code being configured to be executed by the processing device to monitor a state of the message as compared with the baseline state of the message is further configured to be executed by the processing device to:

continually retrieve data related to the at least one external message;

build a predictive model which predicts the level of change between the baseline state and a new state of the message; and predict when the level of change will exceed a threshold based on the predictive model.

\* \* \* \* \*